Aug. 1, 1950        G. FRECHET        2,517,475

RESILIENTLY REACTING DEFORMABLE WHEEL

Filed Jan. 31, 1947        4 Sheets—Sheet 1

Inventor
G. Frechet

Aug. 1, 1950 — G. FRECHET — 2,517,475
RESILIENTLY REACTING DEFORMABLE WHEEL
Filed Jan. 31, 1947 — 4 Sheets-Sheet 2

Inventor
G. Frechet
By Glascock Downing Seebold
Attys

Aug. 1, 1950 G. FRECHET 2,517,475
RESILIENTLY REACTING DEFORMABLE WHEEL
Filed Jan. 31, 1947 4 Sheets-Sheet 3

Inventor
G. Frechet

Aug. 1, 1950        G. FRECHET        2,517,475
RESILIENTLY REACTING DEFORMABLE WHEEL

Filed Jan. 31, 1947        4 Sheets-Sheet 4

Inventor
G. Frechet
By Glascок Downing
Attys.

Patented Aug. 1, 1950

2,517,475

UNITED STATES PATENT OFFICE 2,517,475

RESILIENTLY REACTING DEFORMABLE WHEEL

Gabriel Fréchet, Paris, France

Application January 31, 1947, Serial No. 725,416
In France April 28, 1939

1 Claim. (Cl. 152—100)

The present invention has for its object a resiliently reacting deformable wheel which is intended to provide the vehicles on which such wheels are mounted with all desirable flexibility of travel without having recourse to pneumatic tires.

The wheel according to the invention is characterised by the fact that the hub and the rim are connected to one another by means of resilient connections which enable the reactions of the ground to be absorbed by a relative movement of the hub and the rim.

The essential member of said resilient connections comprises a set of elements forming pistons and cylinders, which are arranged radially between the hub and the rim. In a preferred embodiment of the invention, this set of elements is used in combination with a pivotally mounted spring system which is also arranged between the hub and the rim.

The accompanying drawings show, by way of example, the resiliently reacting deformable wheel according to the invention.

Figure 1:
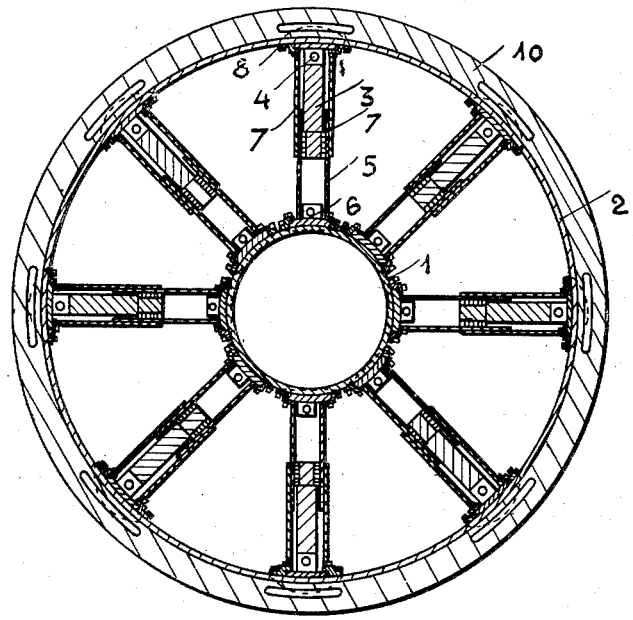
Fig. 1 is a diagrammatic sectional view of a wheel in which the resilient connections exclusively comprise elements forming cylinders and pistons.
Figure 2:
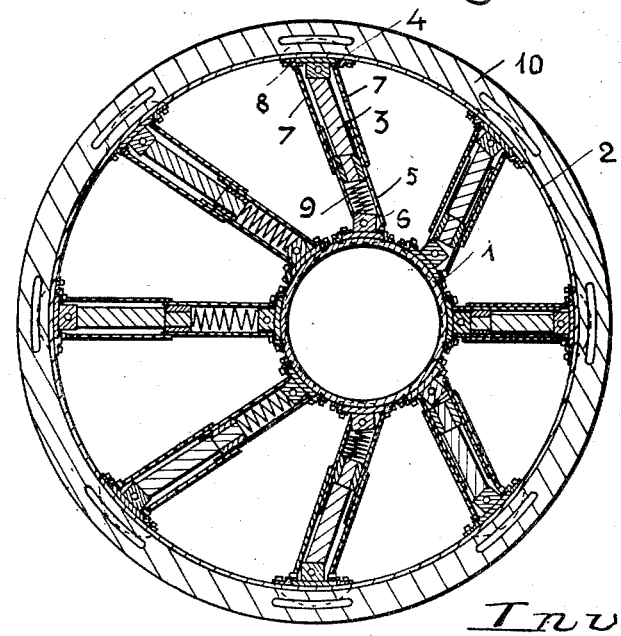
Fig. 2 is the same view, shown in the position in which the hub is eccentric relatively to the rim.

In the embodiment shown in Figs. 1 and 2, in which 1 is the hub of the wheel and 2 the rim, a set of rods 3 which are pivoted at 4 to the rim 2 form pistons in cylinders 5 which are pivoted at 6 to the hub 1. Slide tubes 7 which are pivoted at 8 effect fluid-tightness in the relative movement of the pistons and their respective cylinders. The cylinders 5 may be arranged as compressed air cylinders, in which case the pistons 3 are provided with sealing rings, or said cylinders may be arranged with opposing springs 9 (as shown in Fig. 2), or they may at the same time be compressed air cylinders provided with springs.

The rim 2 is provided with a tire 10 which may be a solid tire, the resilience of the wheel being exclusively obtained by means of the damped relative movement of the pistons 3 in the cylinders 5.

Figure 3:
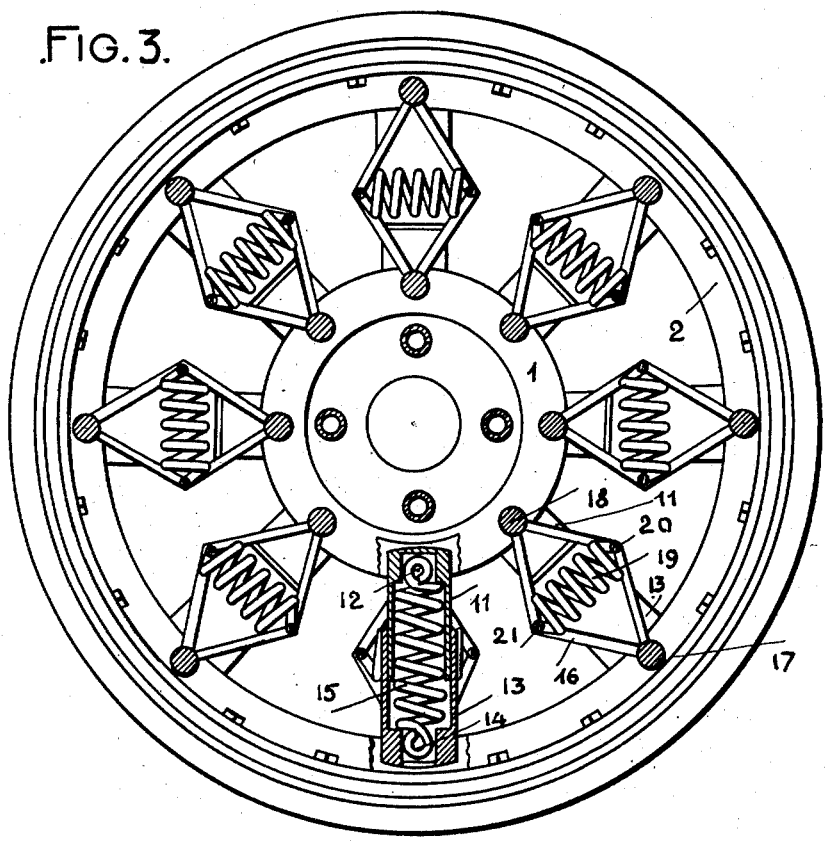
Fig. 3 is an elevational view, in partial section, of an embodiment in which the resilient connections comprise cylinder and piston elements, in combination with pivotally mounted spring systems.

Fig. 3 shows a practical embodiment of the wheel according to the invention. A set of tubular members 11 which are articulated at 12 on swivels provided on the hub 1 can slide with a running fit respectively in tubular members 13 which are articulated at 14 on swivels provided on the rim 2. An opposing spring 15 is mounted internally between each of the pairs of tubular members 11—13.

On the other hand articulated lozenges, formed by flat steel bars 16, are mounted between swivels 17 of the hub 1 and swivels 18 of the rim 2, opposing springs 19 being arranged between the joints 20—21 opposite the joints 17—18. Fig. 3 only shows the articulated lozenges mounted on one of the faces of the wheel, but is is understood that a similar set is provided on the opposite face, symmetrically with respect to the row of resilient members provided with pistons 11—13.

Figure 4:
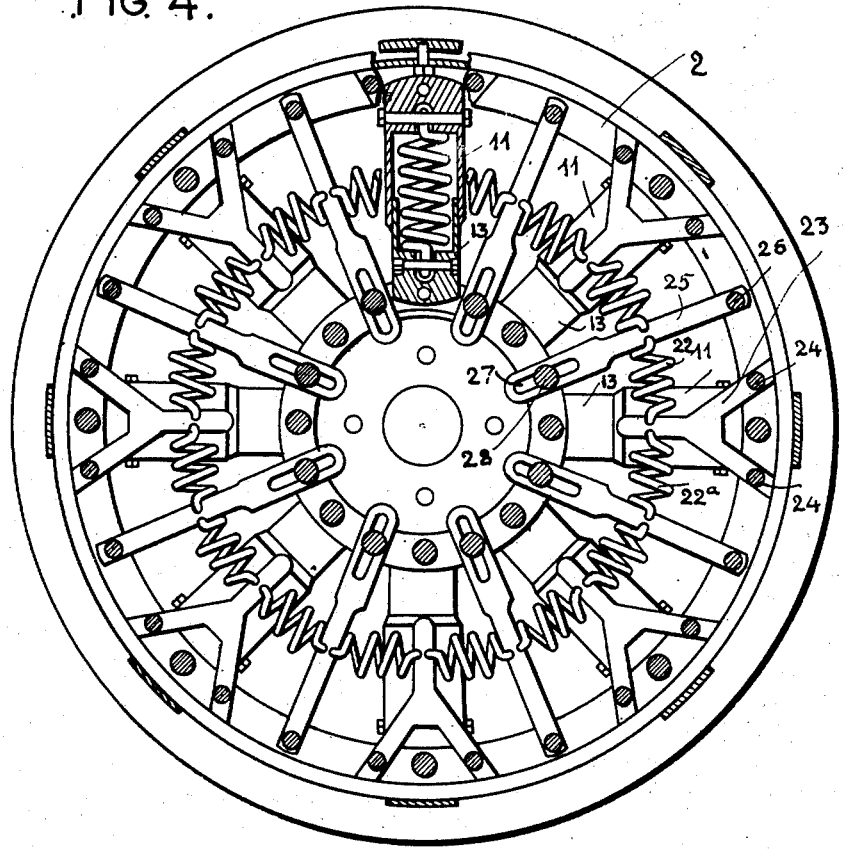
Fig. 4 is an elevational view, in partial section, of a modification of the embodiments shown in Fig. 3.

Fig. 4 shows a modification of the embodiment shown in Fig. 3. This modification comprises the same pairs of tubular members 11—13, but the resilient system outside said tubular members comprises pairs of springs 22—22a, one end of which is fixed to a Y-shaped part 23 fixed at 24 to the rim 2 and the other end of which is fixed to a rod 25 which is pivoted at 26 to the rim 2 and which forms, at its opposite end, a slideway 27 inside which can slide a head 28 mounted on the hub 1. As in the previous embodiment, a row of similar members is arranged, symmetrically to the first row, on the opposite face of the wheel.

Figure 5:
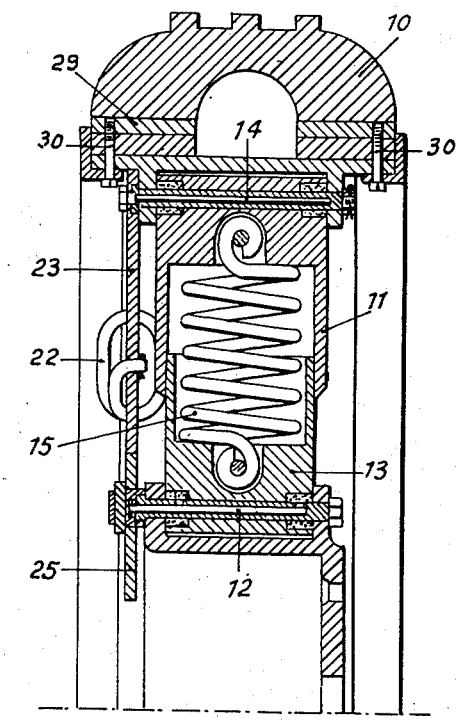
Fig. 5 shows, on a larger scale, the detail of an element of the device according to Fig. 3.

Fig. 5 shows the detail, on a larger scale, of the assembly of resilient members of the device according to Fig. 4. This figure shows in particular the detail of the mounting of the solid tire 10, which is fixed by means of a retaining plate 29 and bolts 30. On the other hand, lubricating ducts are provided inside the pivots of the swivels 12 and 14.

Figure 7:
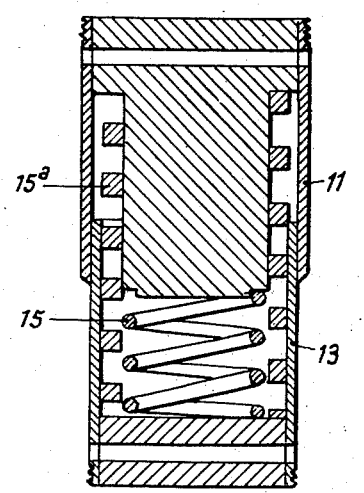
Figs. 6, 7 and 8 show respectively modifications of the manner of construction of the piston elements.
Figure 6:
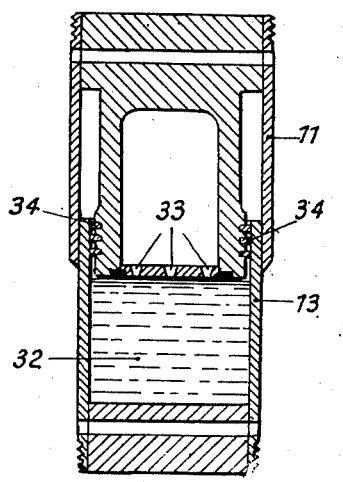
Figure 8:
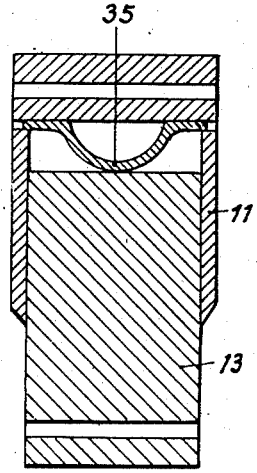

Figs. 6 to 8 show various modifications of the method of construction of the resilient members.

According to the method of construction shown in Fig. 6, the piston 11 is used to compress a fluid in the chamber 32 of the cylinder 13; said piston 11 is provided with ports 33 for the fluid to pass through during the compression or the suction and with sealing rings 34 between its outer surface and the inner surface of the cylinder 13.

Fig. 7 shows a piston and cylinder system with a double spring 15 and 15a; Fig. 8 another modification with an abutment spring 35 provided at the end of the cylinder.

Whatever may be the method of construction, the resilience of the wheel is ensured by the action of the resilient members, the eccentricity of the hub relatively to the rim varying according to the reactions of the ground on the wheel; in particular, the whole system has a tendency to be inclined in the direction of rotation of the wheel, either by the action of the brake, or when travelling up an incline. When the reaction decreases, the system automatically tends to return to its normal position.

Owing to its resilience, the wheel according to the invention enables the use of pneumatic tires to be avoided. The solid tire with which it is provided can wear to its extreme limit, whereby an appreciable saving is effected.

The use of such a wheel also eliminates the risk of accidents caused by the fracture of a suspension spring or of a wheel axle, owing to the fact that it is subjected to and absorbs all the shocks of the road.

It can be mounted on any vehicle, whatever be the shape of the hub. As regards trucks, it has the advantage of making it unnecessary to use twin wheels and spare wheels.

The system of resilient members may be concealed in a case which shields said members from impurities; for example, said case may comprise two hermetically closing plates mounted on each of the two faces of the wheel.

I claim:

In a resilient wheel, a hub, a rim, two interengaged sets of tubular members respectively pivoted to the hub and rim, springs confined between the members of the sets, groups of links connecting the hub and rim at both sides of the sets of tubular members, each of said groups including four links pivotally connected together to present a quadrangular figure having two of the diagonally opposite corners pivotally connected to the hub and rim, and a spring confined between the two remaining diagonally opposite corners of each group of links.

GABRIEL FRÉCHET.

REFERENCES CITED

The following references are of record in the file of this patent:

UNITED STATES PATENTS

| Number | Name | Date |
| --- | --- | --- |
| 1,090,797 | Short | Mar. 17, 1941 |
| 1,177,435 | Musa | Mar. 28, 1916 |
| 1,416,078 | Taylor | May 16, 1922 |
| 1,446,932 | Salus | Feb. 27, 1923 |
| 1,704,120 | Bullum | Mar. 5, 1929 |